United States Patent [19]

Katayama

[11] 4,035,791

[45] July 12, 1977

[54] DOOR ALARM CONTROLLED BY OPERATION OF DOOR LOCK

[76] Inventor: Eizo Katayama, 11-6, Motohama, Nagahama, Shiga, Japan

[21] Appl. No.: 578,344

[22] Filed: May 16, 1975

[51] Int. Cl.² .................... G08B 13/08; B60R 25/10

[52] U.S. Cl. .......................... 340/274 R; 70/379 R; 307/10 AT; 340/63

[58] Field of Search .................... 340/63, 64, 274 R; 200/61.64; 307/10 AT; 70/379 R

[56] References Cited

U.S. PATENT DOCUMENTS

| | | | |
|---|---|---|---|
| 1,131,278 | 3/1915 | Skinner | 340/274 R |
| 1,743,730 | 1/1930 | Rugg et al. | 340/64 |
| 2,839,736 | 6/1958 | Tinsley et al. | 340/63 |
| 2,935,730 | 5/1960 | Procter | 340/63 |
| 3,029,424 | 4/1962 | Savage | 340/63 |
| 3,284,593 | 11/1966 | Hawkins | 340/274 R |
| 3,866,164 | 2/1975 | Peterson | 340/274 R |
| 3,936,673 | 2/1976 | Kelly et al. | 340/63 |

*Primary Examiner*—Glen R. Swann

*Attorney, Agent, or Firm*—Wenderoth, Lind & Ponack

[57] ABSTRACT

A burglar alarm device comprises a door lock fixed on a door, a switch closed by a locking operation of the door lock, a door switch closed by an opening operation of the door, an electric circuit which retains an energized state caused by a closing operation of the door switch when the first-mentioned switch is closed and an alarm controlled by the electric circuit.

2 Claims, 27 Drawing Figures

DOOR ALARM CONTROLLED BY OPERATION OF DOOR LOCK

BACKGROUND OF THE INVENTION

This invention relates to alarm devices to be attached to a door of a car or a house.

An alarm device which sounds when an invader opens a door is universally known, however, known such alarm devices have been inconvenient, because the switch for switching on the alarm device is not connected with the operation of a door lock.

SUMMARY OF THE INVENTION

It is, therefore, an object of the present invention to provide an alarm device which has a switch connected with the locking operation of the door lock.

It is another object of the instant invention to provide an alarm device which is easy to attach to a door.

Further objects of this invention will be disclosed in the following explanation.

BRIEF DESCRIPTION OF THE DRAWINGS

Reference will now be made to the accompanying drawings in which.

DETAILED DESCRIPTION OF THE INVENTION

Figure 10:
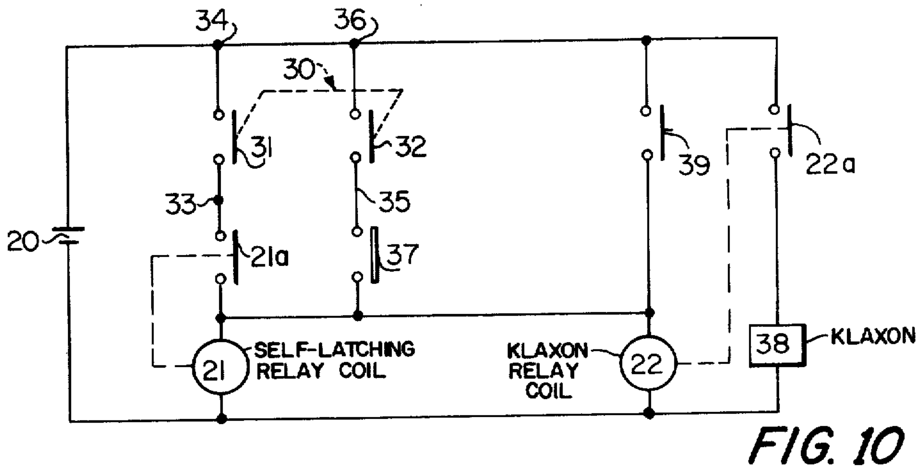
FIGS. 10 and 11 are diagrammatic views of two examples of an alarm circuit according to the present invention.

This invention is explained by way of an example thereof put to use at a door of a car. FIG. 10 shows an alarm circuit using a klaxon as an alarm of the alarm device. In this figure, 20 is a battery, 21 is a coil of a magnet relay forming a circuit for providing a self-retaining operation, 21*a* is a make contact of magnet relay 21, 22 is a coil of a magnet relay for a klaxon 38, 22*a* is a make contact of magnet relay 22 for the klaxon 38. 30 is a main switch consisting of ganged switches 31 and 32, and main switch 30 is closed by the locking operation of a door lock 50 (to be discussed below). The switch 31 has terminals 33 and 34, and the switch 32 has terminals 35 and 36. A door switch 37 is a well known switch which is closed when a door is open and opened when a door is closed. 39 is a switch for the klaxon 38.

In the circuit of FIG. 10, when the door switch 37 is closed after the main switch 30 has been closed, the coil 21 is magnetized and the make contact 21*a* closes. Thereafter, the series circuit of the coil 21, the make contact 21*a* and the switch 31 retains the conducting state by itself even if the door switch 37 opens (i.e. if the door is closed). Such conducting state is maintained until the main switch 30 is opened.

Figure 11:
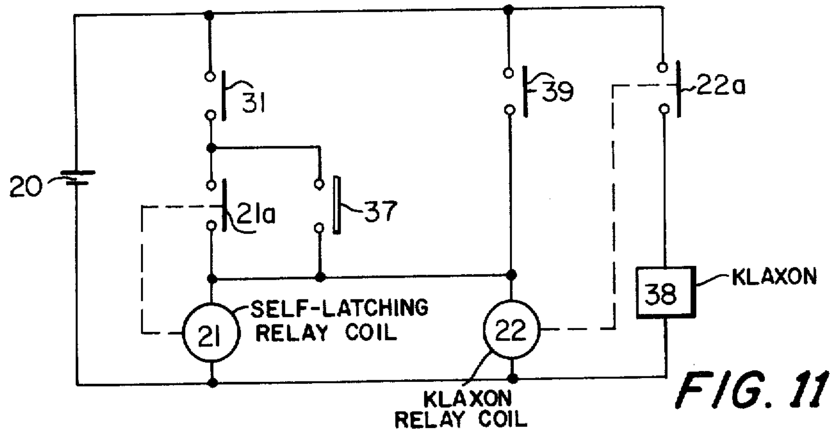
Figure 12A:
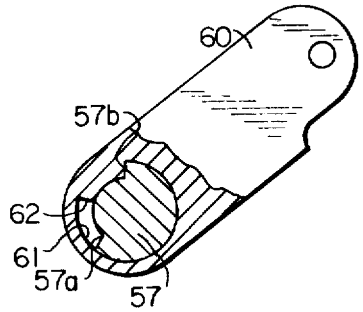
FIGS. 12(*a*), 12(*b*), 12(*c*), 13(*a*), 13(*b*), 13(*c*), 14(*a*), 14(*b*), 14(*c*), 15(*a*), 15(*b*), 15(*c*), 16(*a*), 16(*b*), and 16(*c*) are schematic views showing the operations of an alarm device, with 12(*a*), 13(*a*), 14(*a*), 15(*a*) and 16(*a*) being partially sectioned and showing the combination of the end of a rotary axle and an arm, FIGS. 12(*b*), 13(*b*), 14(*b*), 15(*b*) and 16(*b*) showing the relation between a slider, a rotary axle and a projection, and FIGS. 12(*c*), 13(*c*), 14(*c*), 15(*c*) and 16(*c*) showing the positions of conductors.
Figure 12B:
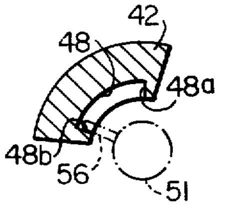
Figure 12C:
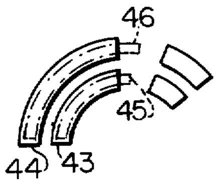

Since the conducting state is retained, the make contact 22*a* is closed by magnetization of the coil 22, and the klaxon 38 sounds and keeps sounding until the main switch 30 is opened. FIG. 11 shows another example of an alarm circuit. In this figure, a switch 31 is closed by the locking operation of the door lock 50. Like reference numerals designate like parts through the views. In the example shown in FIG. 11, when the door switch 37 is closed after the switch 31 has been closed, the klaxon 38 also keeps sounding.

As described above, the alarm circuit of this invention consists of a circuit for providing a self-latching operation such that the alarm keeps sounding upon a switching of such self-latching circuit. The self-latching circuit consists of the coil 21 of a magnet relay, the door switch 37 connected in series to the coil 21, the make contact 21*a* of the magnet relay connected in parallel to the door switch 37, and the switch 31 connected in series to make switch 21*a*, switch 31 being closed by a locking operation of the door lock 50, and the battery 20. The alarm is connected to the self-latching circuit by a suitable auxiliary relay as shown in FIGS. 10 and 11, to one of elements 21, 21*a* or 31 in series or to the coil 21 in parallel.

FIGS. 5, 6, 7, 8 and 9 show a switch box 40 for the main switch 30 used in the circuit shown in FIG. 10. A semicircle slider guide recess 41 is formed in the switch box 40. In slider guide recess 41 is provided a slider 42, which has a suitable form for sliding therein. On opposing facing sides of the slider guide recess 41 and the slider 42 are provided, such as by plating, conductors 43 and 44 in the form of concentric circular arcs with a middle break, and conductors 45 and 46 in the form of concentric circular arcs with the same radiuses as conductors 43 and 44, respectively. The two separated parts of the conductor 43 have terminals 33 and 34, respectively, and the two separated parts of the conductor 44 have terminals 35 and 36. The conductors 43 and 45 form the switch 31 and operate as a switch with their contacts. The conductors 44 and 46 similarly form the switch 32 and operate as a switch with their contacts. A guide hole 47 is formed on the interior side of the switch box 40, and a groove 48 is formed on the side of the slider 42 facing the interior side of the switch box 40.

Figure 1:
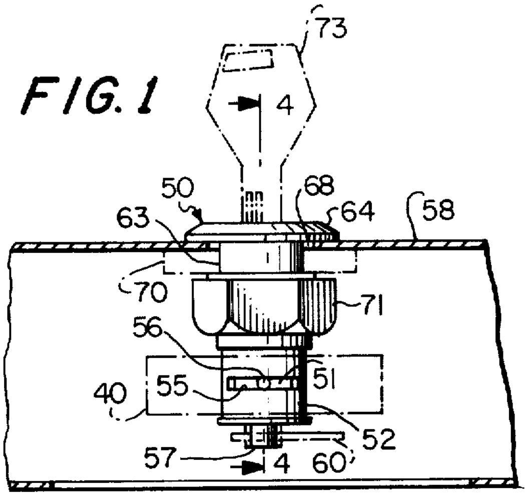
FIG. 1 is a plan view of a door lock fixed on a door shown in section.
Figure 2:
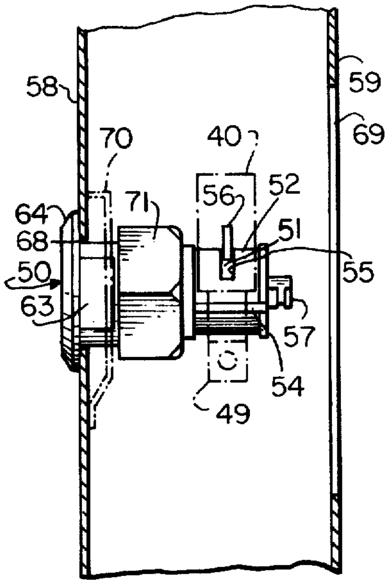
FIG. 2 is a side elevation of a door lock fixed on a door shown in section.
Figure 3:
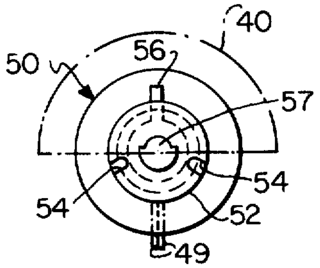
FIG. 3 is a front elevation view of a door lock.

FIGS. 1, 2, 3 and 4 show the door lock 50. The door lock 50 consists of a rotary axle 51 and a cylinder 52, and the switch box 40 is fixed to the outside of the cylinder 52 as shown by the imaginary lines. Two straps or band 49 attached to the switch box 40 are wound around the cylinder 52 and the ends of each strap are fastened so as to fix the switch box 40 in position. A narrow protuberance 53 may be formed inside each strap 49 as shown in FIG. 5, and protuberance 53 may be inserted in narrow grooves 54 formed on the outside surface of the cylinder 52 as shown in FIGS. 2 and 3, thereby making it possible to prevent the switch box 40 from sliding on the outer surface of the cylinder 52 when turning of the rotary axle 51 causes the slider 42 to slide, as will be mentioned below. A projection 56 is inserted into a circular arc-shaped guide hole 55 formed through the side of the cylinder 52.

Figure 8:
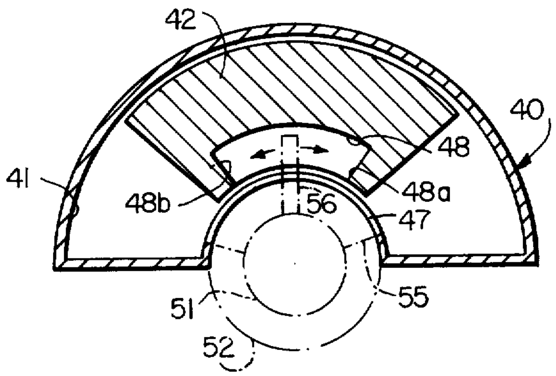
FIG. 8 is an enlarged sectional view of a switch box taken along line 8—8 of FIG. 6.
Figure 9:
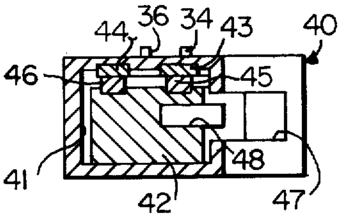
FIG. 9 is an enlarged sectional view of a switch box taken along line 9—9 of FIG. 6.

One end of the projection 56 is fixed to the rotary axle 51 and another end is inserted into the groove 48 of the slider 42 through the guide hole 47 of the switch box 40 as shown in FIG. 8. When a door key 73 is inserted into the door lock 50 as shown in FIG. 1 and the rotary axle 51 is turned clockwise or counterclockwise, the projection 56 moves as shown by the arrow in FIG. 8 and pushes a side face 48*a* or 48*b* of the groove 48 and moves the slider 42 clockwise or counterclockwise along the slider guide recess 41.

An arm 60, shown by imaginary lines in FIG. 1, is fixed to the end 57 of the rotary axle 51 and transmits a locking operation of the door lock 50 to a latch (not illustrated) of the door. The end 57 has a circular arc-shaped notch, and an axle hole 61 of the arm 60, into which the end 57 is inserted, has a latch 62 whose form corresponds to that of the notch, as shown in FIGS. 3 and 12 through 16. The circumferential length of the notch is longer than that of the latch 62, and thus there is a space in the notch of the end 57 not occupied by the latch 62. When the rotary axle 51 turns clockwise or counterclockwise, the side 57*a* or 57*b* of the notch pushes the latch 62, turns the arm 60 in the same direction, and the door is latched or unlatched. The arm 60 is also turned by a knob (not illustrated) attached beside the window of the door, whereby the door is also latched or unlatched. This knob is used for locking the door from the interior of the car.

Figure 13A:
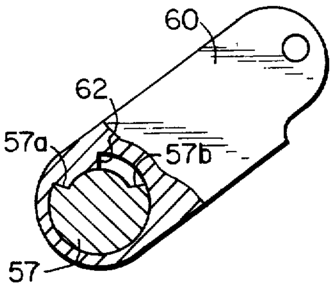
Figure 13B:
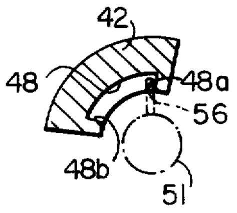
Figure 13C:
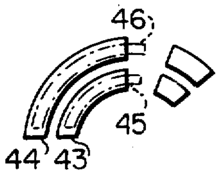

FIGS. 12 through 16 show the operation of the alarm device of the invention. In each of FIGS. 12(*a*), 13(*a*), 14(*a*), 15(*a*) and 16(*a*) there is shown the turning position of the arm 60. Each of FIGS. 12(*b*), 13(*b*), 14(*b*), 15(*b*) and show the turning position of the slider 42. Each of FIGS. 12(*c*), 13(*c*), 14(*c*), 15(*c*) and 16(*c*) show the relative positions of the conductors 45 and 46 to the conductors 43 and 44. All positions and directions of the elements in the following explanation are based on FIGS. 12 through 16. FIG. 13 shows the relative positions of the elements at the time when the key is not inserted and the door is unlatched. As the interruptions between the separate portions of the conductors 43 and 44 are not bridged by the conductors 45 and 46, the main switch 30 is open.

Figure 14A:
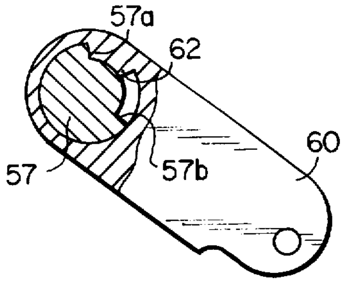
Figure 14B:
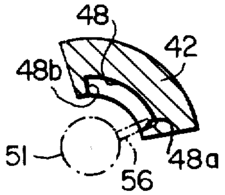
Figure 14C:
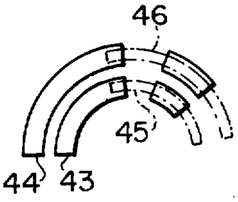

When the key 73 is inserted into the door lock 50 and turned for a locking operation, the rotary axle 51 turns clockwise, the side 57*a* of the end 57 pushes the latch 62 of the arm 60, and the arm 60 turns clockwise as shown in FIG. 14, and the door is latched. At the same time, the projection 56 pushes the side 48*a* of the groove 48, and the slider 42 turns clockwise. Therefore, the conductors 45 and 46 turn clockwise and bridge each middle break of conductors 43 and 44, and the main switch 30 is closed.

Figure 15A:
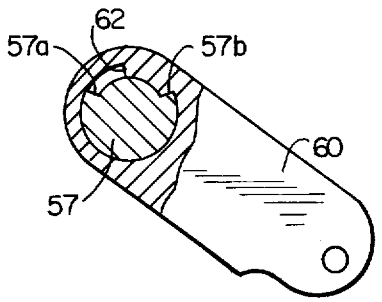
Figure 15B:
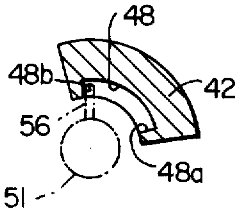
Figure 15C:
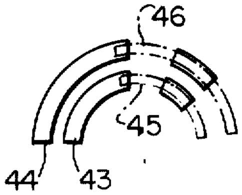

The key 73 is pulled out of the door lock 50 after the key 73 turns the rotary axle 51 back to the position shown in FIG. 13. As there is a sufficient space not occupied by the latch 62 in the notch of the end 57, the arm 60 is not turned by this operation, and the elements are positioned as shown in FIG. 15. Furthermore, as a sufficient room is formed in the groove 48 of the slider 42 so as to be free from the movement of the projection 56 turning with the rotary axle 51, the slider 42 does not turn as shown in FIG. 15. Therefore locked state of the door and closed state of the main switch 30 continue.

Figure 16A:
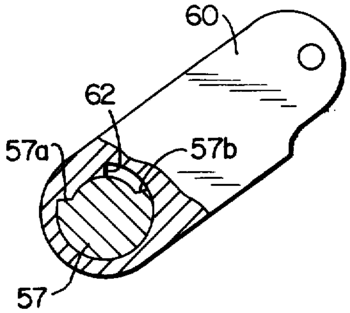
Figure 16B:
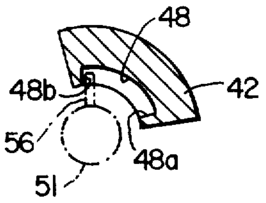
Figure 16C:
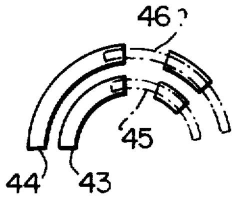

When an invader opens the door without a key, he breaks a window glass of the door, inserts his hand into the interior of the car and pulls up the knob. Then, as shown in FIG. 16, the arm 60 turns counterclockwise from the position shown in FIG. 15 and the door is unlatched. As the arm 60 can turn only the angle corresponding to the space not occupied by the latch 62 in the notch of the end 57 by this operation, the door can be opened. However, as shown in FIG. 16 the position of the rotary axle 51 is the same as the position shown in FIG. 15. Therefore, the main switch 30 remains closed. When the invader opens the door subsequently, the door switch 37 is closed, and the klaxon 38 sounds as an indication of a burglary. Even if he shuts the door on this occasion, due to the self-latching circuit the klaxon 38 keeps sounding.

When the door lock 50 is opened with the key 73 from the state shown in FIG. 15, the rotary axle 51 is turned counterclockwise by the key 73. Then the side 57*b* of the notch of the end 57 pushes the latch 62 and turns the arm 60 counterclockwise to the position shown in FIG. 12, and the door is unlatched. As the side face 48*b* of the groove 48 is pushed by the projection 56 and the slider 42 turns counterclockwise at the same time, the conductors 45 and 46 change their positions to the left and cease to bridge the conductors 43 and 44, respectively, and the main switch 30 is opened.

As the switch box 40 for the alarm device of this invention is fixed on the outside of the cylinder 52 and attached between an exterior plate 58 of the door and an interior wall 59 thereof as shown in FIGS. 1 and 2, the invader cannot locate the alarm device.

Figure 17:
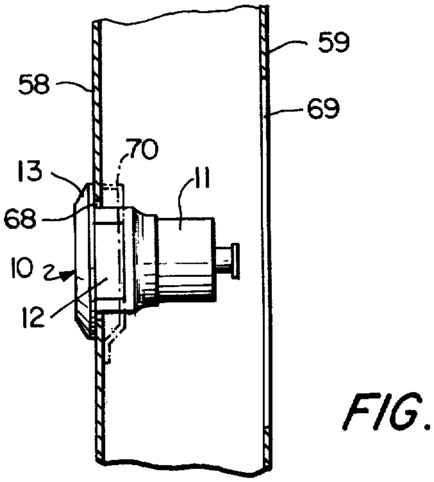
FIG. 17 is a side elevation of a universally known door lock fixed on a door drawn by a sectional plan.

A known door lock 10 is attached between the exterior plate 58 and the interior wall 59 as discussed in the following explanation and as shown in FIG. 17. A single element cylinder 11 is inserted through a hole 68 in the exterior plate 58 and a fastening piece 70 shown by imaginary lines is fastened in a grooved side 12 of the cylinder 11. As the exterior plate 58 is held tight between the fastening piece 70 and the flange 13 of the cylinder 11, the door lock 10 is fixed tight on the exterior plate 58. The attachment of the fastening piece 70 is done through a hand hole 69 in the interior wall 59. However, it is not easy to fix the switch box 40 to the door lock 10 already fixed on the exterior plate 58, because the size of the hand hole 69 is not sufficient for the necessary manipulations.

Figure 4:
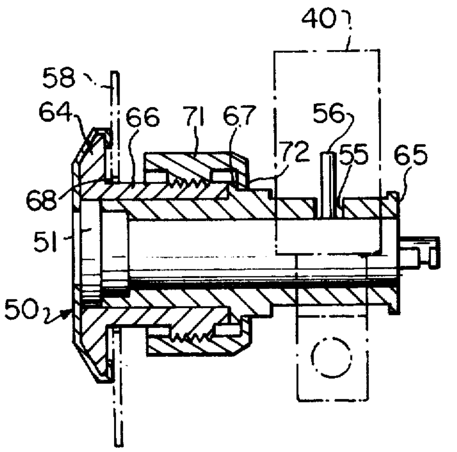
FIG. 4 is an enlarged sectional view of a door lock taken along line 4—4 of FIG. 1.
Figure 5:
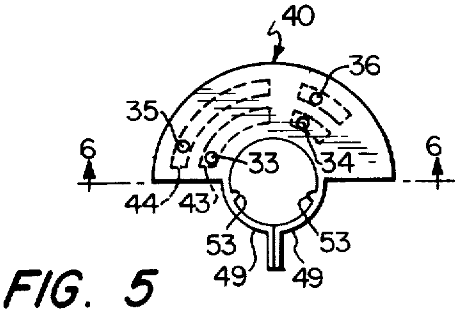
FIG. 5 is a front elevation view of a switch box.
Figure 6:
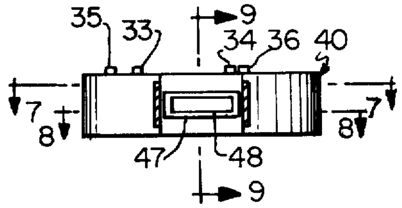
FIG. 6 is a sectional view of a switch box taken along line 6—6 of FIG. 5.
Figure 7:
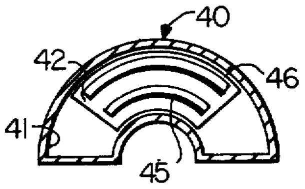
FIG. 7 is a sectional view of a switch box taken along line 7—7 of FIG. 6.

On the other hand, the cylinder 52 of the present invention consists of two separate cylindrical pieces 65 and 66 as shown in FIG. 4. A cap nut 71 is first positioned on first separate piece 65 of the cylinder 52 to which the switch box 40 is fixed. The rotary axle 51 is inserted into the separate piece 65 and the projection 56 is screwed to the rotary axle 51 through the guide hole 55. Secondly the switch box 40 is fixed to the separate piece 65. Next, second separate piece 66 of the cylinder 52 having a flange 64 is inserted into the hole 68 of the exterior plate 58 and separate piece 66 is fixed to the exterior plate 58 by a fastening piece 70 fastened to a grooved side 63 of the separate piece 66 (FIGS. 1 and 2). Subsequently the separate piece 65 is inserted into separate piece 66 through the hand hole 69 of the interior wall 59 until a flange 67 located at the middle of the separate piece 65 contacts the end of separate piece 66. Lastly the cap nut 71 is screwed onto the separate piece 66 and the flange 67 of the separate piece 65 is held tight between the end of separate piece 66 and the bottom 72 of the cap nut 71. The structure of the cylinder 52 being separated into two pieces as described above makes it easy to attach the switch box 40, since the switch box 40 can be previously attached to piece 65. Of course the structure of the section of the door lock 50 to be fixed on the exterior panel 58 may be varied as desired according to the model of car. But as the cylinder 52 of this invention consists of two separate pieces, it is only necessary to prepare various types of the separate pieces 66 with the flanges 64, and all the other elements may be universal.

I claim:

1. A burglar alarm device comprising:

a door lock attachable to a door, said door lock including a cylinder and a rotary axle extending through said cylinder;

a switch positioned to be closed by a locking operation of said door lock;

a door switch positioned to be closed by an opening operation of said door;

a self-latching electric circuit means connected to said switches for maintaining a conducting state caused by a closing operation of said door switch when said first-mentioned switch is closed;

an alarm connected to and controlled by said circuit means; and said first-mentioned switch comprising a switch box fixed to the outer surface of said cylinder of said door lock, said switch box having therein a semicircular recess, a slide slidably movably positioned within said recess in said switch box, said slider having therein a groove, means for moving said slider within said recess in said switch box upon locking and unlocking movement of said door lock, said moving means comprising a projection having a first end fixed to said rotary axle of said door lock and a second end extending into said groove in said slider, said projection extending through said cylinder, a two-part first conductor and a second conductor facing said first conductor, one of said conductors being on the inside of said switch box, and the other of said conductors being on said slider, whereby a locking operation of said door lock causes said second conductor to bridge the two parts of said first conductor, thus closing said first-mentioned switch.

2. The burglar alarm device as claimed in claim 1, wherein said door lock cylinder comprises a flanged first element joined to a second element to which said switch box is fixed.

* * * * *